(No Model.) 2 Sheets—Sheet 1.
W. A. FRETWELL.
CLOVER PLOW PLANTER.
No. 593,092. Patented Nov. 2, 1897.
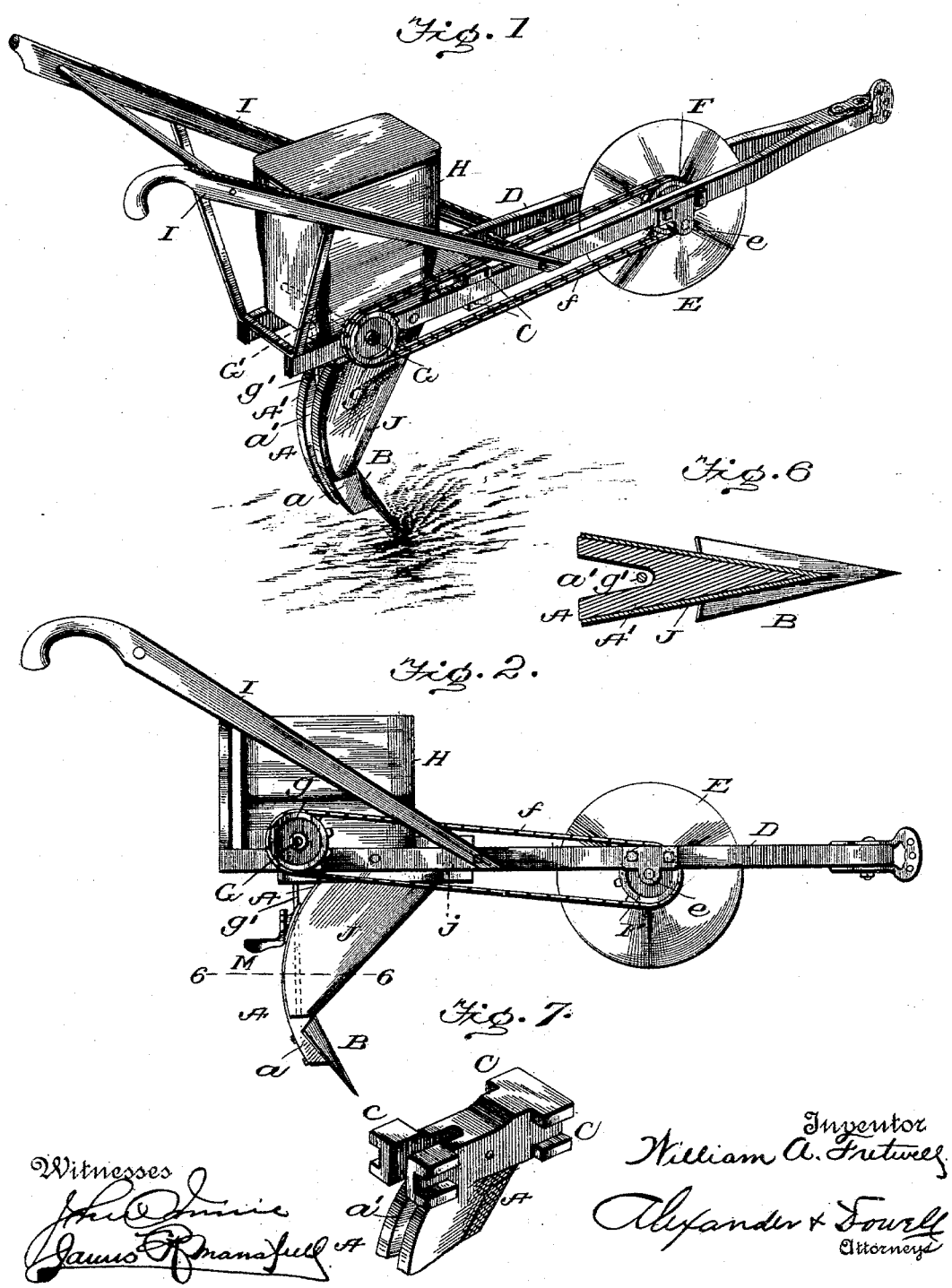

(No Model.) 2 Sheets—Sheet 2.

W. A. FRETWELL.
CLOVER PLOW PLANTER.

No. 593,092. Patented Nov. 2, 1897.

Witnesses

Inventor
William A. Fretwell
By Alexander & Dowell
Attorneys

UNITED STATES PATENT OFFICE.

WILLIAM A. FRETWELL, OF REIDSVILLE, NORTH CAROLINA.

CLOVER-PLOW PLANTER.

SPECIFICATION forming part of Letters Patent No. 593,092, dated November 2, 1897.

Application filed March 13, 1897. Serial No. 627,317. (No model.)

*To all whom it may concern:*

Be it known that I, WILLIAM A. FRETWELL, of Reidsville, in the county of Rockingham and State of North Carolina, have invented certain new and useful Improvements in Clover-Plow Planters; and I hereby declare that the following is a full, clear, and exact description thereof, reference being had to the accompanying drawings, which form part of this specification.

This invention is an improvement in sod and clover plows and cultivators; and its object is to enable the subsoil to be loosened without turning furrows and without clogging of the plow by the grass or vines and to enable a fertilizer to be applied to the roots of the clover, &c., at the same time.

To this end the invention consists in the novel constructions and combinations of parts hereinafter described and claimed.

Figure 3:
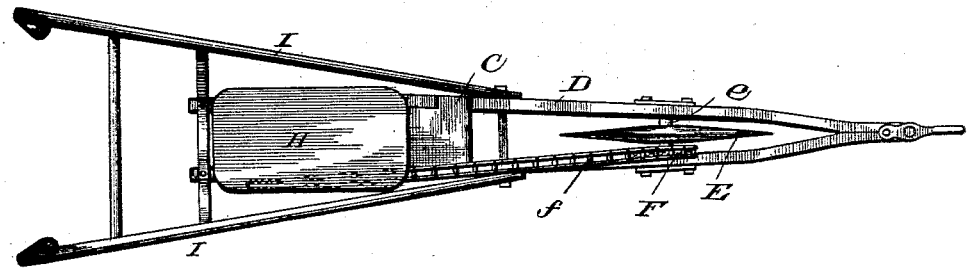
Figure 4:
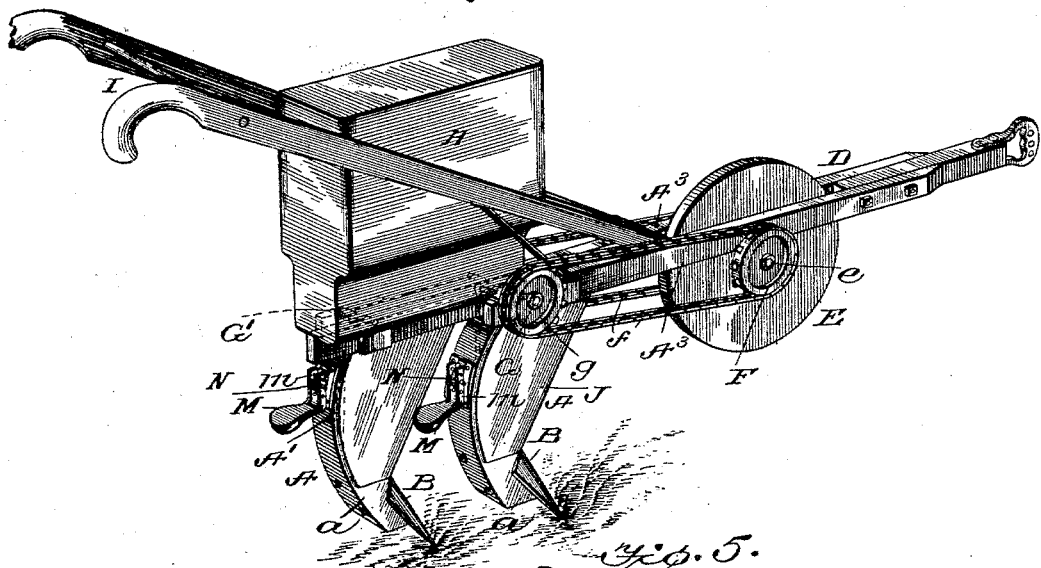
Figure 5:
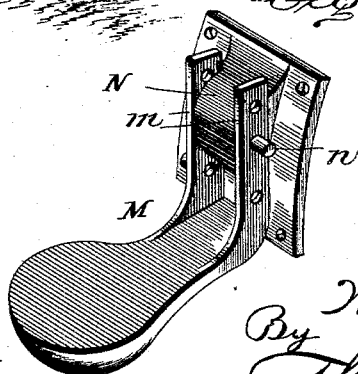

Referring to the drawings, Figure 1 is a perspective view of a one-horse clover plow and cultivator embodying my invention. Fig. 2 is a side view thereof. Fig. 3 is a top view thereof. Fig. 4 is a detail view showing how a double cultivator may be constructed, and Fig. 5 is a perspective view of the gage and furrow-closer detached. Fig. 6 is a cross-section on line 6 6, Fig. 2, showing the detachable plate. Fig. 7 is a perspective view of the upper portion of the plow-foot.

In said drawings, A designates the foot part of the plow, which is provided with a toe $a$ for the attachment of a point B. Instead of being curved like an ordinary cultivator-foot, however, I make the foot with an increased thickness of metal above the toe, as at A', said part A' being wedge-shaped or triangular in cross-section, Fig. 6, with its thin edge foremost and said thin edge being straight, but inclining upwardly from the toe at an angle of about ninety degrees thereto, so as to form a cutter extending from the toe to the beam. This edge obviously, if tempered or chilled, will cut the soil and sod, and I propose in cheap plows to so use it. However, for the purpose of avoiding dulling of this edge and to facilitate sharpening thereof when worn I propose to employ removable cutter-blades fitted onto this portion A', as hereinafter described. This formation causes the plow to cut quickly and easily through the soil and prevents accumulations of vines, brush, &c., under the foot and also prevents turning of the soil, enabling me to make a deep subsoil cut, if desired, without overturning much or any sod or turf.

The edge of part A' is convex vertically like an ordinary cultivator-beam, and in it is a channel $a'$ for the passage of fertilizer, grain, &c., when the foot is used in connection with a drill. This channel $a'$ extends under the toe and, if desired, might be a closed bore for the greater part of its length, so as to prevent dropping out of fertilizer, &c., before it reaches the bottom of the furrow.

As shown in Figs. 1 and 2, the foot is provided at top with pairs of front and rear lugs C $c$ on each side, between which lugs are fitted the bifurcations of the beam D, as shown.

Just in front of the plow-foot and in the bifurcation of the beam is a wheel or disk E, which is fixed on a short shaft $e$, journaled in the bifurcations of the beam D or bearings attached thereto, and on shaft $e$ is also fixed a sprocket F, which, by means of chain $f$, drives another sprocket $g$ on the shaft G of the feeding device in hopper H for distributing the fertilizer therein, mounted on the plow-beam above the foot. Wheel E may be a rotary cutter, if desired. The shaft G may be provided with a crank G', to which is connected a rod $g'$, which jiggers the fertilizer, &c., through the passage $a'$ into the ground. Handles I may be connected to the foot or beam in any convenient manner.

For a double plow or for cultivators the lugs C $c$ may be omitted and the foot formed with a short forward extension, by which the foot can be readily secured to a beam.

In Fig. 4 a two-horse plow or cultivator is shown, and it will be readily understood that the beams are applicable to sulky or riding plows or cultivators as well as to the ordinary forms shown, also that the power-wheel could be placed behind the beam, if preferred.

To prevent wear of the front edge of part A' of the foot, I provide a removable triangular cutter-blade J, Figs. 2 and 6, which is fitted thereover, the upper end of the blade being engaged in a notch or socket $j$ in the upper part of the foot, while the lower end will be retained in place by the tongue or hoe B, bolted to toe $a$. This cutter-blade J can be readily removed and sharpened when worn, or replaced if broken, and protects both the edge and sides of part A' of the beam.

As shown in Figs. 4 and 5, a gage and furrow-closer M is attached to the rear of the part A' of the beam. This gage is preferably formed of metal and is convex on its under side, so as to ride easily upon the ground, is slightly wider than the cutting part of the plow, and is provided with two parallel upstanding bars m m on its front end, which have a series of lateral perforations through them and are adapted to embrace an eye N on the beam in rear of part A' and to be fastened thereto by a pin n, which transfixes the bars and eye. Obviously the gage can be adjusted up or down by inserting the pin in higher or lower perforations in the bars m. The device M serves the double purpose of a gage to regulate the depth of the cut and as an evener or closer to fill the cut made by the beam.

Having thus described my invention, what I therefore claim as new, and desire to secure by Letters Patent thereon, is—

1. A cultivator-foot having a downwardly and forwardly inclined toe, and a triangular forwardly and upwardly inclined cutting portion as A' above the toe, substantially as and for the purpose described.

2. The herein-described foot for cultivators &c., having a downwardly and forwardly inclined toe on its lower end for the attachment of a tongue, or shovel, and an enlarged thickened portion A' above the toe having a front forwardly and upwardly inclined cutting edge, and a passage or channel in its rear portion leading to the toe, for the purpose and substantially as described.

3. The combination of an upwardly and forwardly inclined portion A' above the toe and the foot having toe a, with the removable cutting-blade J triangular in cross-section, detachably fitted on portion A', substantially as and for the purpose described.

4. The herein-described foot for cultivators &c., having a downwardly and forwardly inclined toe on its lower end for the attachment of a tongue, or shovel, and an enlarged portion A' above the toe having a front forwardly and upwardly inclined cutting edge, and a passage or channel in its rear portion leading to the toe; with the removable blade J fitted over the said inclined cutting edge of the foot, substantially as and for the purpose described.

5. The combination of the foot having forwardly-inclined enlarged cutting portion A', and lugs C, c, substantially as described, with the bifurcated beam, the wheel, the hopper, and means for operating the hopper dropping mechanism from the wheel, substantially as and for the purpose set forth.

6. The combination of the beam, the foot A having toe a and enlarged cutting portion A' having a groove a' in its rear; with the cutter-wheel E, the hopper H, and the shaft G, and jigger-rod g', and means, substantially as described, for operating shaft G from the cutter-wheel, all substantially as and for the purpose set forth.

7. The combination with the plow having an eye as N on its rear edge, with the vertically-adjustable furrow gage and closer M having perforated parallel bars m adapted to embrace the edge, and the bolt n transfixing said bars and eye, all substantially as and for the purpose described.

In testimony that I claim the foregoing as my own I affix my signature in presence of two witnesses.

WM. A. FRETWELL.

In presence of—
J. A. FETZER,
S. A. HUBBARD.